Nov. 26, 1957  W. N. JOHNSON  2,814,743
COMBINED TORQUER AND PICK-OFF
Filed Sept. 6, 1956

INVENTOR.
WILLIAM N. JOHNSON
BY Joseph E. Ryan
ATTORNEY

United States Patent Office 2,814,743
Patented Nov. 26, 1957

2,814,743

COMBINED TORQUER AND PICK-OFF

William N. Johnson, St. Paul, Minn., assignor to Minneapolis-Honeywell Regulator Company, Minneapolis, Minn., a corporation of Delaware Application September 6, 1956, Serial No. 608,327

8 Claims. (Cl. 310—36)

This invention relates to a torquer and error signal pick-off, and more specifically discloses a combined unit wherein the coils for both units are mounted on a balanced cup-shaped support within a physically balanced unitary stator structure.

In the past, torquers and pick-off units were developed where the units had a common axis but were placed at opposite ends of an associated device, such as a gyroscope. With this type of arrangement, the over-all length of the gyroscope was excessive and much space was wasted. In an effort to reduce the length of the unit, the torquer and pick-off were placed in the same plane at one end of the gyroscope and the units were interrelated by a rotatable bar or arm. While this arrangement serves to reduce the length of the unit and cut down on wasted space, the use of a single torquer and pick-off elements mounted diametrically opposite and interconnected by a rotatable arm, could produce undesirable effects. With a single torquer element the reaction of a current carrying conductors in a permanent magnet field is to produce both torque and a lateral force on the moving element of a gyroscope. This effect would increase jewel and pivot friction in devices employing these types of bearings. With a single pick-off unit there is no provision for distinguishing between rotational displacements and lateral displacements. If two torquers or pick-offs are mounted in either case, diametrically opposite than the forces produced by the torquer are compensated or balanced and the reaction is that of pure torque. Also the outputs of the two pick-offs compensate for small lateral displacements giving a unit which is sensitive only to rotational displacements even if these are superimposed on small lateral displacements.

It is an object of this invention to disclose an improved, combined torquer and pick-off for gyroscopes and other devices, wherein, the unit is physically and electrically balanced.

It is a further object to disclose an improved combination where the laminated magnetic structure of both the torquer and pick-off are combined into a single integral unit.

Still a further object is to disclose a combined torquer and pick-off which is more compact than conventional units.

These and other objects will become more apparent when the following specification is considered with the attached drawings, wherein.

Figure 1:
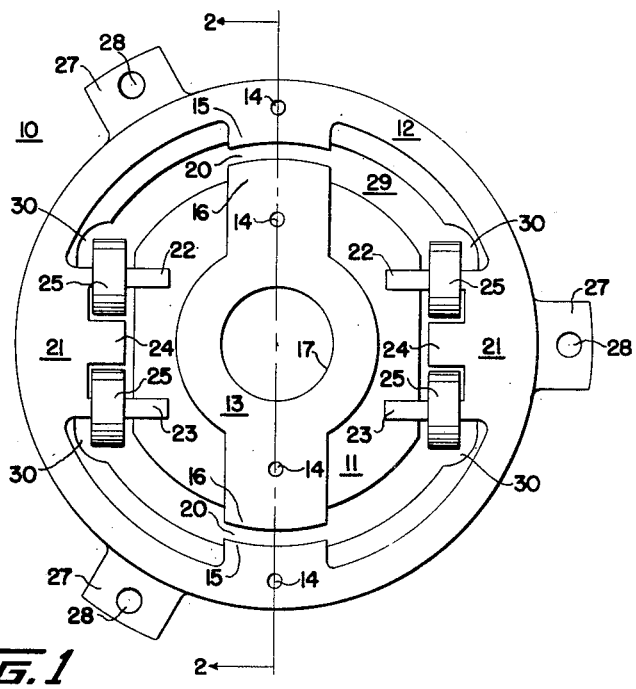
Figure 1 is an elevation of the combined stator section only.
Figure 2:
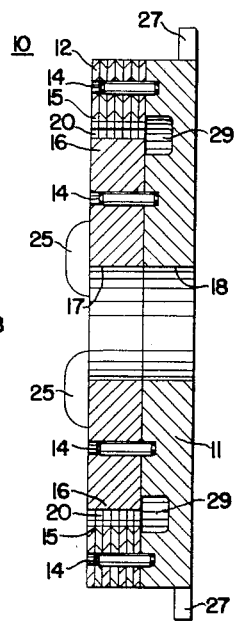
Figure 2 is a cross-section of Figure 1 along line 2—2.

In Figures 1 and 2 there is disclosed generally at 10 a stator assembly for the torque generator and pick-off unit. The stator 10 is attached to a non-magnetic assembly or base plate 11 which holds a group of laminated stator rings 12 and a permanent magnet core 13. Both the ring 12 and permanent magnet core 13 are held in place by a plurality of pins 14 which pass through the individual members into the base plate 11.

The laminated rings 12 are formed of conventional magnetic material and are held together by a bonding process well known to those versed in the art. The rings 12 further have projections or pole pieces 15 which project inwardly from the structure at diametrically opposite locations. The poles 15 further correspond in location to north and south poles 16 of the permanent magnet 13. The permanent magnet 13 has a central opening 17 which is aligned with a central opening 18 of the assembly plate 11. The purpose of the central openings 17 and 18 will become apparent as an explanation of the complete device is comprehended. It is obvious that between the pole projections 15 and 16 of the rings 12 and the permanent magnet 13 there are air gaps 20. The air gaps 20 have a magnetic field developed between the pole faces 15 and 16 and due to the narrow gap as compared to the surrounding gap between the magnet 13 and the ring 12 it becomes obvious that the high concentration of flux results. This high concentration of flux is utilized, as will be noted below, in the torque generating section of the unit.

Placed equal distance between pole projections 15 on stator 10 there are two magnetic pick-off sections 21. The magnetic pick-off section 21 each have outer legs 22 and 23 and a central leg 24. It should be noted that the pick-off section 21 is integral with the rings 12 in the disclosed preferred embodiment. It is obvious, however, that the pick-off unit 21 could be formed of separate laminations properly joined to the ring 12 and located as herein disclosed. The legs 22 and 23 each have an energizing coil 25 which, when properly energized, forms the stator section of a conventional E-type of pick-off. In view of the fact that this particular type of pick-off is well known to the art no description of the interconnection of the energizing coils is disclosed.

For convenience in construction and mounting, the assembly plate 11 is provided with a plurality of mounting ears 27 which each contain mounting holes 28. The mounting plate 11 further has a circular channel 29 which allows clearance for the rotor member which will be described in detail below in connection with Figures 3, 4, and 5. The base plate 11 further has recesses as necessary at 30 to allow for the proper insertion of coils 25 upon the legs 22 and 23 of the pick-off member 21.

Figure 3:
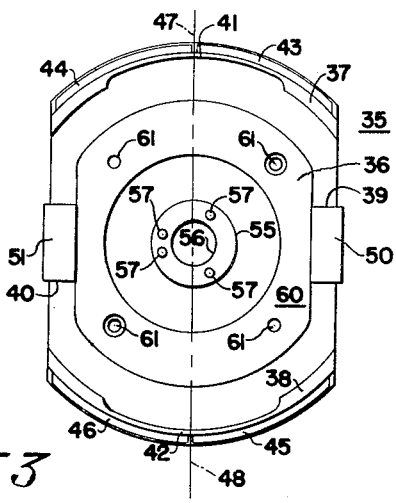
Figure 3 is an elevation of the cup-shaped rotor unit.
Figure 4:
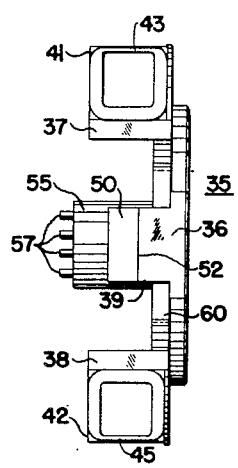
Figure 4 is a side elevation of Figure 3.
Figure 5:
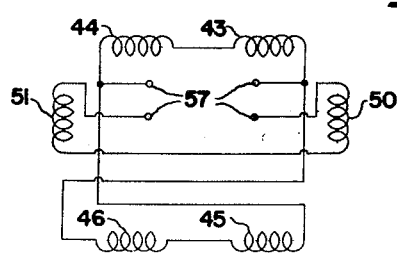
Figure 5 is a wiring diagram of the windings of the rotor of Figures 3 and 4.

In Figures 3, 4, and 5 there is disclosed a rotor member generally disclosed at 35. The rotor 35 is substantially a cup-shaped member having a central hub 36 and a plurality of outwardly projecting members 37, 38, 39, and 40. The projections 37 and 38 each have a reduced central cross section at 41 and 42. The reduced cross sections 41 and 42 are located in the air gaps 20 of the stator element 10 when the rotor 35 and the stator 10 are assembled. Attached to the face of the rims 37 and 38 are a plurality of coils 43, 44, 45, and 46. These coils are pre-wound in a flat configuration and are then mounted to the surface of the rims 37 and 38 or molded therein. The configuration of the coils can best be seen in Figure 4. Each coil has one leg which falls in the air gap 20 and these legs all fall adjacent to the center lines 47 and 48 of the rims 37 and 38. The interconnection of the group of coils 43 through 46 is shown schematically in Figure 5.

As previously noted there are projections 39 and 40 which extend from the hub 36 of the rotor 35. The projections 39 and 40 support two coils 50 and 51. Both coils 50 and 51 are wound on an insulated tubular form in a conventional manner and the forms are then attached to the projections 39 and 40 by means of a cement at surface 52 or molded into the rotor 35. Coils 50 and 51 fall in the air gap which is created between the legs 22 and 23 of the pick-off of the pick-off member 21. As previously noted this type of moving coil pick-off is well known to those versed in the art. The interconnection between coils 50 and 51 is shown schematically in Figure 5.

The rotor 35 has attached as part of the hub 36 a core 55 which has a central opening 56. Embedded in the core 55 are four terminal pins 57. The terminal pins are again shown in Figure 5 as the terminal connections for the plurality of coils used on the rotor member 35. The connection means between the terminal pins 57 and the ends of the coils 43 through 46 and coils 50 and 51 may be of any convenient nature. These connection means have not been shown but it is understood that they may be embedded in the surface of the rotor element 35 or cemented to the surface in any convenient fashion. When the rotor element 35 is assembled with the stator 10 the rims 37 and 38 of the rotor fall in the air gaps 20 and in the channel 29. The hub 55 of the rotor element 35 falls in the opening 17 of the permanent magnet 13 and the opening 18 of the assembly plate 11. The central opening 56 is thus left open from the face of the rotor element 35 to the central axis of the combined unit. Through the central opening 56 there are inserted the necessary connection leads which attach to pins 57. It should be noted that these connection leads fall very close to the central axis of the device and thereby create little or no restraining force on the rotational movement of the rotor member 35. In the hub 36 of the rotor 35 there is provided thickened section 60 which contains a plurality of mounting holes 61. By means of the mounting holes 61 the rotor element 35 may be attached conveniently to any associated equipment.

The operation of the overall device is quite simply visualized when considering each of the two functions which are involved. The flux passing between poles 15 and 16 across air gaps 20 link the coils 43 through 46. If the coils 43 through 46 are properly oriented and interconnected a torque will be developed which will move the rims 37 and 38 either clockwise or counter-clockwise depending on the polarity of the energization supplied to the windings. It is obvious therefore that a rotary movement is yielded by the torque generating section of the device. Attached to the same rotor 35 are two pick-off coils 50 and 51 which fall between the legs 22 and 23 of the pick-off 21. With the coils 25 of the pick-off 21 energized any shift of the coils 50 and 51 in the air gaps between the legs 22 and 23 shifts the division of flux linkages in each of the coils 50 and 51. This shift in the division of flux linkages is reflected as a change in amplitude and phase in the pick-off coils 50 and 51 and is used to sense the amount of rotation created by the torque generating section of the unit. It is obvious therefore, that a very compact generator and signal pick-off have been provided. This particular unit is not only compact, but it is completely balanced. Additional advantage is obtained by this arrangement in that it is perfectly symmetrical both in the stator and rotor. Having a symmetrical rotor is of advantage in maintaining the radial balance of the gyroscopic element to which the rotor is attached. In the presence of varying temperatures the associated contractions or expansions will not disturb the mechanical balance.

It is obvious to those skilled in the art that many modifications could be made in this type of unit and only the preferred embodiment has been disclosed. With this in mind, the applicant wishes to be limited only by the appended claims.

I claim as my invention:

1. In a device of the class described: torque generating means comprising magnetic means having a plurality of magnetic poles; said generating means further including a magnetic structure having poles opposite said magnetic poles; pick-off means comprising a plurality of magnetic elements each having a plurality of legs; said elements included with said structure; a rotatable member having a plurality of projections including projections between the outer legs of said magnetic elements of said pick-off means; first electrical coils supported by said projections adjacent said magnetic means; and second electrical coils supported by said projections between said outer legs of said pick-off means; said coils and said structure being rotatable with respect to each other.

2. In a device of the class described: torque generating means comprising a magnetic means having a plurality of magnetic poles; said generating means further including a magnetic structure having pole projections opposite said magnetic poles and defining annular air gaps therebetween; pick-off means comprising a plurality of magnetic elements each having a plurality of legs; said elements included with said structure and positioned between said pole projections; a supporting means having projections in said air gaps and between the outer legs of said magnetic elements of said pick-off means; first electrical coils supported by said projections in said air gaps of the torque generating means; and second electrical coils supported by said projections between said outer legs of said pick-off means; said coils and said structure being rotatable with respect to each other.

3. In a device of the class described: torque generating means comprising a permanent magnetic core having a plurality of poles; said generating means further including a magnetic structure having pole projections opposite said magnetic poles and defining annular air gaps therebetween; pick-off means comprising a plurality of magnetic elements each having a plurality of legs; said elements included with said structure and positioned between said pole projections; a supporting member having projections in said air gaps and between the outer legs of said magnetic elements of said pick-off means; first electrical coils supported by said projections in said air gaps of the torque generating means; and second electrical coils supported by said projections between said outer legs of said pick-off means; said coils and said structure being rotatable with respect to each other.

4. In a device of the class described: torque generating means comprising a permanent magnetic core having a plurality of poles; said generating means further including a stator having pole projections opposite said magnetic poles and defining annular air gaps therebetween; pick-off means comprising a plurality of E-shaped stator sections joined with said generating means stator and located between said pole projections; a supporting member rotatably supported and having projections in said air gaps and between the outer legs of said E-shaped stator sections; first electrical coils supported by said projections in said air gaps of said torque generating means; and second electrical coils supported by said projections between the outer legs of said E-shaped stator of said pick-off means; said coils being rotatable with said supporting member.

5. In a device of the class described: torque generating means comprising a permanent magnetic core having a plurality of poles; said generating means further including an annular stator having pole projections opposite said magnetic poles and defining annular air gaps therebetween; inductive pick-off means comprising a plurality of E-shaped stator sections integral with said annular stator and located between said pole projections; a non-magnetic supporting means rotatably supported and having projections in said air gaps and between the outer legs of said E-shaped stator sections; first electrical coils supported upon said projections in said air gaps of said torque generating means; and second electrical coils supported upon said projections between the outer legs of said E-shaped stator of said pick-off means; said coils being rotatable with said supporting means.

6. In a device of the class described: torque generating means comprising a permanent magnetic core having a north and a south pole; said generating means further including an annular stator having pole projections opposite said magnetic poles and defining annular air gaps therebetween; inductive pick-off means comprising two E-shaped stator sections integral with said annular stator and located between the pole projections; a non-magnetic supporting means rotatably supported and having projections in said air gaps and between the outer legs of said E-shaped stator sections; first electrical coils supported upon said projections in said air gaps of said torque generating means; and second electrical coils supported upon said projections between the outer legs of said E-shaped stator of said pick-off means; said coils being rotatable with said supporting means.

7. In a device of the class described: a supporting means having rim like portions concentric to a central rotational axis; a pair of torque generating means disposed substantially equidistant on diametrically opposite sides of said axis; a pair of signal generating means disposed substantially equidistant on diametrically opposite sides of said axes and 90° displaced from said torque generating means; first electric coils supported by said rim like portions in operable relationship with said torque generating means; and second electrical coils supported by said rim like portions in operable relationship with said signal generating means; said supporting means and said generating means being rotatable with respect to each other.

8. In a device of the class described: a supporting means having portions parallel to a central rotational axis; torque generating means disposed on diametrically opposite sides of said axis; signal generating means disposed on diametrically opposite sides of said axis and displaced from said torque generating means; first electrical coils supported by some of said portions in operable relationship with said torque generating means; and second electrical coils supported by other of said portions in operable relationship with said signal generating means; said supporting means and said generating means being rotatable with respect to each other.

No references cited.